Patented Apr. 16, 1940

2,196,988

UNITED STATES PATENT OFFICE 2,196,988

PHENOL COMPOSITIONS

Sheldon B. Heath and Wayne L. Scoles, Midland, Mich., assignors to The Dow Chemical Company, Midland, Mich., a corporation of Michigan No Drawing. Application March 30, 1939, Serial No. 264,973

8 Claims. (Cl. 167—31)

This invention concerns compositions comprising bentonite and solid phenol compounds in which at least a portion of the bentonite is dispersed in and through the phenol compound and held thereby as in solid suspension.

Phenols have had wide application as constituents of microbicidal, fungicidal, and insecticidal compositions. When employed in aqueous suspension, in solution in organic solvents, or as a solute in the oily phase of oil-water emulsion compositions, it is desirable that phenols, and particularly solid phenols, be available in finely divided form. The state of subdivision preferred is such that the phenol be quickly and completely suspended or otherwise dispersed in the liquid carrier without the necessity of heating.

Efforts to provide solid phenol compounds in finely divided form as by grinding, etc., have proven impractical, due to the tendency of particles of such compounds to coalesce and pack together. Furthermore, such phenols when ground cannot be conveniently stored in finely divided form since the particles tend to grow together, sublime, or otherwise to reassociate, giving rise to agglomerates which render the product unsatisfactory for use in insecticidal or microbicidal preparations where fine particle size is of paramount importance.

U. S. Patent 2,146,739 discloses a fusion mixture of 2.4-dinitro-6-cyclohexyl-phenol with an equal weight, or less, of bentonite, which composition disintegrates on contact with water. While the compositions of the patent are productive of fine dispersions of dinitro-cyclohexyl-phenol, other phenols such as dinitro-cresol, 2.4-dinitro-phenol, 2-phenylphenol, 2.4.6-trichloro-phenol, and the like, cannot be substituted for the dinitro-cyclohexyl-phenol to obtain equally satisfactory phenolic suspensions. Fusion mixtures of such solid phenols with up to an equal weight of bentonite are not readily wet, are slow to disintegrate on contact with water, and do not result in a phenolic dispersion of fine particle size.

An object of this invention is to provide compositions comprising solid phenol compounds generally, which compositions will readily wet and disintegrate on contact with water to give fine dispersions or suspensions of phenolic constituents. A further object of the invention is to provide compositions comprising solid phenol compounds which may be roughly comminuted and thereafter stored indefinitely without undergoing change in particle size or other chemical or physical alteration. An additional object is to provide a method for the preparation of such composition. Other objects of the invention will become apparent from the following specification.

We have discovered that when a phenol compound melting above 50° C. is fused with greater than an equal weight of bentonite, and the fusion mixture thereafter solidified by cooling and roughly comminuted, a readily wettable product is obtained which rapidly disintegrates on contact with water to give a suspension of minute particles of the solid phenol. This substantially anhydrous fusion mixture does not readily absorb moisture from the air and is not appreciably affected by exposure to air and light or by prolonged storage. We have further found that such solid dispersions are well adapted for use in the preparation of microbicidal and insecticidal compositions, e. g., aqueous suspensions of solid phenol compounds, dusts comprising such compounds in finely divided form, and particularly tank-mix oil-water emulsions.

In preparing my new compositions, the bentonite is intimately mixed into the molten phenol compound and the resulting paste solidified by cooling below the fusion temperature of the mixture to obtain a porous friable cake which is roughly comminuted by crushing or grinding. The state of subdivision of the comminuted product is not critical, although a material having an average particle size of from 5 to 60 screen mesh is preferred. In the finished product, the solidified phenol holds at least an equal weight of bentonite in solid dispersion. The remaining bentonite in the mixture is impregnated with the solid phenol and distributed through the mixture. When wet with water, the dispersed bentonite swells, whereby the phenol crystals are broken apart into fine crystal segments. The remainder of the bentonite improves the wetting characteristics of the mixture, increases the speed with which disintegration takes place, and contributes generally to the formation of a dispersion of minimum particle size.

An alternate procedure comprises intimately mixing or grinding the bentonite and phenol together, heating the mixture to a temperature substantially above the melting point of the phenol, and thereafter cooling and comminuting the fused product. This method is particularly effective where large excesses of bentonite are employed and results in a thick, stiff paste which, on cooling, forms a crumbly, friable product.

The amount of bentonite mixed with the phenol compound may vary from approximately 1.1 to 2.0 parts per part by weight of phenol, the preferred amount thereof depending upon the particular phenol employed. When less than 1.1 parts of bentonite is used, products are obtained which wet poorly and disintegrate slowly, forming relatively coarse particles of most phenols when dispersed in water. When more than 2.0 parts of bentonite is used, fusion products are obtained which are difficult to mix and which, on grinding, yield heterogeneous compositions in which lumps of substantially unmodified phenols may be present. Such compositions do not have satisfactory disintegrating characteristics.

The preferred compositions obtained according to the foregoing procedures are those which rapidly wet and disintegrate to produce aqueous dispersion of solid phenols in the form of fine crystal segments having an average particle size of from 1 to 3 microns diameter. The following table sets forth the preferred ratios of bentonite adapted to produce optimum results with certain representative phenol compounds:

| Phenol | Melting point °C. | Parts bentonite per part phenol by weight |
|---|---|---|
| 2-hydroxy-diphenyl | 56 | 1.3–1.8 |
| Pentachloro-phenol | 188 | 1.1–1.4 |
| 2.4-dinitro-phenol | 114 | 1.1–1.5 |
| 2.4-dinitro-6-methyl-phenol | 85 | 1.4–2.0 |
| 2.4-dinitro-6-cyclohexyl-phenol | 106 | 1.3–1.8 |

Representative fusion mixtures adapted to be employed for germicidal and fungicidal purposes are those having the following percentage composition:

Per cent by weight
2.4.6-trichloro-phenol ---------------------- 40
Bentonite ---------------------------------- 60

2-hydroxy-diphenyl ------------------------- 40
Bentonite ---------------------------------- 60

Pentachloro-phenol ------------------------- 48
Bentonite ---------------------------------- 52

In each instance the bentonite was added slowly with stirring into the molten phenol at temperatures ranging between 10° and 20° C. above the melting point of the phenol. The resulting mixtures were thick pastes which were thereafter solidified by cooling to obtain friable cakes of material which were ground to an average particle size of 20–60 screen mesh. Each of these ground products disintegrated rapidly when stirred with water to give a slurry of swelled bentonite in which the phenol was dispersed in a particle size averaging approximately 1–3 microns in diameter. These phenolic dispersions were adapted to be further diluted with water to form germicidal and fungicidal compositions.

Similar compositions adapted for use in the preparation of insecticidal materials included the following:

Per cent by weight
2.4-dinitro-phenol -------------------------- 46.6
Bentonite ---------------------------------- 53.4

2.4-dinitro-6-methyl-phenol ----------------- 35
Bentonite ---------------------------------- 65

2.4-dinitro-6-cyclohexyl-phenol ------------ 40
Bentonite ---------------------------------- 60

The compositions comprising 2.4-dinitro-phenol and 2.4-dinitro-6-cyclohexyl-phenol were prepared substantially as described above. In the case of 2.4-dinitro-6-methyl-phenol, the phenol was first ground with the bentonite, and the resulting mechanical mixture heated and stirred at 95°–100° C. to form a stiff paste which, after cooling and crushing, gave the desired composition.

The suspended phenol particles obtained by disintegration of the foregoing compositions averaged a particle size of from 1–2 microns diameter. Water-oil emulsions prepared by mixing these products with water, lubricating oil, and emulsifying agent were adapted to be employed as dormant sprays for the control of insect pests.

Among other phenols which can be similarly compounded with bentonite are 2.4.5.6-tetrachloro-phenol, 2.4.6-tribromophenol, 4-n-hexyl-resorcinol, 4-tertiarybutyl-phenol, 2.6-dinitro-para-cresol, dinitro thymol, and other solid mono-, di-, and tri-hydroxy-benzene compounds melting preferably above 50° C.

Wetting and dispersing agents such as sulphite process waste liquor products, spruce extract, sulphonated oils and fatty acids, sulphonated alcohols, blood albumen, phenol sulphonic acids and their salts may be included in any of the foregoing compositions. The inclusion of such materials accelerates the tendency of the fusion mixtures to become wetted upon contact with water. These wetting and dispersing agents may, if desired, be added to the fusion mixtures in the molten state, although it is preferred that such additions be made to the cooled and roughly ground product by mechanically mixing.

We claim:

1. A roughly comminuted composition comprising 1 part of a solid phenol compound and from 1.1 to 2.0 parts by weight thereof of bentonite and in which at least 1 part of the bentonite is in solid suspension in the phenol.

2. A roughly comminuted composition consisting of 1 part of a solid phenol compound, from 1.1 to 2.0 parts by weight of bentonite, and a wetting agent, and in which at least 1 part of the bentonite is in solid suspension in the phenol.

3. A composition prepared by mixing together 1 part of a solid phenol compound with from 1.1 to 2.0 parts by weight of bentonite at a temperature above the melting point of the phenol, solidifying the mixture by cooling below the fusion temperature, and roughly comminuting the resulting cake, and in which an amount of bentonite at least equal in weight to the phenol is in solid suspension therein.

4. A substantially anhydrous mixture of bentonite and a solid phenol compound prepared by mixing together 1 part of phenol with from 1.1 to 2.0 parts by weight of bentonite at a temperature above the melting point of the phenol, and thereafter roughly comminuting the cooled mixture.

5. A roughly comminuted composition comprising 1 part of a phenol melting above 50° C. and from 1.1 to 2.0 parts by weight thereof of bentonite and in which at least 1 part of the bentonite is in solid suspension in the phenol.

6. A roughly comminuted composition comprising 1 part of a nitrophenol compound melting above 50° C. and from 1.1 to 2.0 parts by weight thereof of bentonite and in which at least 1 part of the bentonite is in solid suspension in the nitrophenol.

7. A roughly comminuted composition comprising 1 part of 2.4-dinitro-phenol and from 1.1 to 1.5 parts by weight thereof of bentonite and in which at least 1 part of the bentonite is in solid suspension in the dinitro-phenol.

8. A roughly comminuted composition comprising 1 part of 2.4-dinitro-6-methyl-phenol and from 1.4 to 2.0 parts by weight thereof of bentonite and in which at least 1 part of the bentonite is in solid suspension in the 2.4-dinitro-6-methyl-phenol.

SHELDON B. HEATH.
WAYNE. L. SCOLES.